US011836595B1

United States Patent
Yang et al.

(10) Patent No.: US 11,836,595 B1
(45) Date of Patent: Dec. 5, 2023

(54) NEURAL ARCHITECTURE SEARCH SYSTEM USING TRAINING BASED ON A WEIGHT-RELATED METRIC

(71) Applicant: Lemon Inc., Grand Cayman (KY)

(72) Inventors: Linjie Yang, Los Angeles, CA (US); Taojiannan Yang, Los Angeles, CA (US); Xiaojie Jin, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 108 days.

(21) Appl. No.: 17/816,167

(22) Filed: Jul. 29, 2022

(51) Int. Cl.
*G06N 3/08* (2023.01)
*G06N 3/04* (2023.01)

(52) U.S. Cl.
CPC .............. *G06N 3/04* (2013.01); *G06N 3/08* (2013.01)

(58) Field of Classification Search
CPC ........................................................ G06N 3/08
See application file for complete search history.

(56) References Cited

U.S. PATENT DOCUMENTS

| | | | | |
|---|---|---|---|---|
| 2020/0104699 A1* | 4/2020 | Zhou | .................... | G06N 3/08 |
| 2020/0104715 A1* | 4/2020 | Denolf | ................... | G06N 3/006 |
| 2021/0312261 A1* | 10/2021 | Xu | ........................ | G06N 3/08 |
| 2021/0312276 A1* | 10/2021 | Rawat | ................. | G06K 9/6227 |
| 2021/0319272 A1* | 10/2021 | Gaidon | ................ | G06N 3/082 |
| 2022/0101089 A1* | 3/2022 | Abdelfattah | ............ | G06N 3/08 |
| 2022/0121906 A1* | 4/2022 | Kokiopoulou | .......... | G06N 3/08 |

FOREIGN PATENT DOCUMENTS

| | | | | |
|---|---|---|---|---|
| WO | WO-2021178916 A1 * | 9/2021 | | |
| WO | WO-2022072890 A1 * | 4/2022 | | |
| WO | WO-2022154829 A1 * | 7/2022 | ............... | G06N 3/04 |

OTHER PUBLICATIONS

Peng et al., "Cream of the Crop: Distilling Prioritized Paths For One-Shot Neural Architecture Search", 2020 (Year: 2020).*
Kandasamy et al., "Neural Architecture Search with Bayesian Optimisation and Optimal Transport", 2018 (Year: 2018).*
Wei et al., "NPENAS: Neural Predictor Guided Evolution for Neural Architecture Search", 2020 (Year: 2020).*

(Continued)

*Primary Examiner* — Selene A. Haedi
(74) *Attorney, Agent, or Firm* — Alleman Hall Creasman & Tuttle LLP

(57) ABSTRACT

Systems and methods for performing neural architecture search are provided. In one aspect, the system includes a processor configured to select a plurality of candidate neural networks within a search space, evaluate a performance of each of the plurality of candidate neural networks by: training each candidate neural network on a training dataset to perform the predetermined task and determining a ranking metric for each candidate neural network based on an objective function. The ranking metric includes a weight-related metric that is determined based on weights of a prediction layer of each respective candidate neural network before and after the respective candidate neural network is trained. The processor is configured to rank the plurality of candidate neural networks based on the determined ranking metrics.

20 Claims, 11 Drawing Sheets

(56) References Cited

OTHER PUBLICATIONS

Abdelfattah, M. et al., "Zero-Cost Proxies for Lightweight NAS," Proceedings of the 2021 International Conference on Learning Representations, Vienna, Austria, May 3, 2021, 17 pages.
Bender, G. et al., "Understanding and Simplifying One-Shot Architecture Search," Proceedings of the 35th International Conference on Machine Learning, Stockholm, Sweden, Jul. 10, 2018, 10 pages.
Borroni, C., "A new rank correlation measure," Statistical Papers, vol. 54, Dec. 20, 2011, 16 pages.
Brock, A. et al., "SMASH: One-Shot Model Architecture Search through HyperNetworks," Proceedings of the 6th International Conference on Learning Representations, Vancouver, Canada, Apr. 30, 2018, 21 pages.
Carbonnelle, S. et al., "Layer rotation: a surprisingly powerful indicator of generalization in deep networks?," Proceedings of the ICML 2019 Workshop on Identifying and Understanding Deep Learning Phenomena, Long Beach, California, Jun. 6, 2019, 19 pages.
Chen, Y. et al., "DetNAS: Backbone Search for Object Detection," Proceedings of the 33rd Conference on Neural Information Processing Systems, Vancouver, Canada, Dec. 8, 2019, 11 pages.
Chen, W. et al., "FasterSeg: Searching for Faster Real-time Semantic Segmentation," Proceedings of the 2020 International Conference on Learning Representations, Addis Ababa, Ethiopia, Apr. 26, 2020, 14 pages.
Chen, W. et al., "Neural Architecture Search on ImageNet in Four GPU Hours: A Theoretically Inspired Perspective," 2021 International Conference on Learning Representations, Vienna, Austria, May 3, 2021, 15 pages.
Chen, X. et al., "Progressive Differentiable Architecture Search: Bridging the Depth Gap between Search and Evaluation," Proceedings of the 2019 IEEE/CVF International Conference on Computer Vision (ICCV), Seoul, South Korea, Oct. 27, 2019, 10 pages.
Chen, X. et al., "Stabilizing Differentiable Architecture Search via Perturbation-based Regularization," Proceedings of the 2020 International Conference on Machine Learning, Vienne, Austria, Jul. 12, 2020, 12 pages.
Chrabaszcz, P. et al., "A Downsampled Variant of ImageNet as an Alternative to the CIFAR datasets," arXiv:1707.08819v3, Cornell University, Available Online at https://arxiv.org/abs/1707.08819, Aug. 23, 2017, 9 pages.
Deng, J. et al., "ImageNet: A Large-Scale Hierarchical Image Database," Proceedings of the 2009 IEEE Conference an Computer Vision and Pattern Recognition, Miami, Florida, Jun. 20, 2009, 8 pages.
Dong, X. et al., "NAS-Bench-201: Extending the Scope of Reproducible Neural Architecture Search," Proceedings of the 2020 International Conference on Learning Representations, Addis Ababa, Ethiopia, Apr. 26, 2020, 16 pages.
Dong, X. et al., "Searching for A Robust Neural Architecture in Four GPU Hours," Proceedings of the 2019 IEEE/CVF Conference on Computer Vision and Pattern Recognition (CVPR), Long Beach, California, Jun. 15, 2019, 10 pages.
Guo, Z. et al., "Single Path One-Shot Neural Architecture Search with Uniform Sampling," Proceedings of the European Conference on Computer Vision, Glasgow, United Kingdom, Aug. 23, 2020, 16 pages.
Hu, Y. et al., "Angle-based Search Space Shrinking for Neural Architecture Search," Proceedings of the European Conference on Computer Vision, Glasgow, United Kingdom, Aug. 23, 2020, 21 pages.
Lee, N. et al., "SNIP: Single-shot Network Pruning based on Connection Sensitivity," Proceedings of the International Conference on Learning Representations, New Orleans, Louisiana, May 6, 2019, 15 pages.
Lee, J. et al., "Wide Neural Networks of Any Depth Evolve as Linear Models Under Gradient Descent," Proceedings of the 33rd Conference on Neural Information Processing Systems, Vancouver, Canada, Dec. 8, 2019, 12 pages.
Li, L. et al., "Random Search and Reproducibility for Neural Architecture Search," arXiv:1902.07638v3, Cornell University, Available Online at https://arxiv.org/pdf/1902.07638.pdf, Jul. 30, 2019, 11 pages.
Liu, C. et al., "Auto-DeepLab: Hierarchical Neural Architecture Search for Semantic Image Segmentation," Proceedings of the 2019 IEEE/CVF Conference on Computer Vision and Pattern Recognition (CVPR), Long Beach, California, Jun. 15, 2019, 11 pages.
Liu, H. et al., "DARTS: Differentiable Architecture Search," Proceedings of the International Conference of Learning Representations, New Orleans, Louisiana, May 6, 2019, 13 pages.
Liu, H., "Hierarchical Representations for Efficient Architecture Search," Proceedings of the International Conference on Learning Representations, Vancouver, Canada, Apr. 30, 2018, 13 pages.
Liu, C. et al., "Progressive Neural Architecture Search," Proceedings of the European Conference on Computer Mision, Munich, Germany, Sep. 8, 2018, 16 pages.
Mellor, J. et al., "Neural Architecture Search without Training," Proceedings of the 38th International Conference on Machine Learning, Virtual Event, Jul. 18, 2021, 11 pages.
Montúfar, G. et al., "On the No. of Linear Regions of Deep Neural Networks," Proceedings of the 27th International Conference on Neural Information Processing Systems, Montreal, Canada, Dec. 8, 2014, 9 pages.
Pham, H. et al., "Efficient Neural Architecture Search via Parameter Sharing," Proceedings of the 35th International Conference on Machine Learning, Stockholm, Sweden, Jul. 10, 2018, 10 pages.
Real, E. et al., "Regularized Evolution for Image Classifier Architecture Search," Proceedings of the Thirty-Third AAAI Conference on Artificial Intelligence, Honolulu, Hawaii, Jan. 27, 2019, 10 pages.
Tan, M. et al., "EfficientDet: Scalable and Efficient Object Detection," Proceedings of Computer Vision and Pattern Recognition 2020, Virtual Event, Jun. 14, 2020, 10 pages.
Tan, M. et al., "MnasNet: Platform-Aware Neural Architecture Search for Mobile," Proceedings of Computer Vision and Pattern Recognition, Long Beach, California, Jun. 16, 2019, 9 pages.
Tanaka, H. et al., "Pruning neural networks without any data by iteratively conserving synaptic flow," Proceedings of the 34th Conference on Neural Information Processing Systems, Virtual Event, Dec. 6, 2020, 13 pages.
Wang, C. et al., "Picking Winning Tickets Before Training by Preserving Gradient Flow," Proceedings of the 2020 International Conference on Learning Representations, Addis Ababa, Ethiopia, Apr. 26, 2020, 11 pages.
Wu, B. et al., "FBNet: Hardware-Aware Efficient ConvNet Design via Differentiable Neural Architecture Search," Proceedings of the 2019 IEEE/CVF Conference on Computer Vision and Pattern Recognition, Jun. 15, 2019, Long Beach, California, 10 pages.
Xiao, L. et al., "Disentangling Trainability and Generalization in Deep Neural Networks," Proceedings of the 37th International Conference on Machine Learning, Vienna, Austria, Jul. 13, 2020, 29 pages.
Xiong, H. et al., "On the Number of Linear Regions of Convolutional Neural Networks," Proceedings of the 37th International Conference on Machine Learning, Vienna, Austria, Jul. 13, 2020, 23 pages.
Xu, Y. et al., "PC-DARTS: Partial Channel Connections for Memory-Efficient Architecture Search," Proceedings of the 2020 International Conference on Learning Representations, Addis Ababa, Ethiopia, Apr. 26, 2020, 13 pages.
Ying, C. et al., "NAS-Bench-101: Towards Reproducible Neural Architecture Search," 36th International Conference an Machine Learning, Long Beach, California, Jun. 10, 2019, 15 pages.
Yu, K. et al., "Evaluating The Search Phase of Neural Architecture Search," Proceedings of the 2020 International Conference on Learning Representations, Addis Ababa, Ethiopia, Apr. 26, 2020, 16 pages.
Zhang, X. et al., "Neural Architecture Search with Random Labels," 2021 IEEE/CVF Conference on Computer Vision and Pattern Recognition (CVPR), Virtual Event, Jun. 19, 2021, 12 pages.
Zoph, B. et al., "Learning Transferable Architectures for Scalable Image Recognition," Proceedings of the 2018 IEEE/CVF Confer-

(56) References Cited

OTHER PUBLICATIONS ence on Computer Vision and Pattern Recognition (CVPR), Salt Lake City, Utah, Jun. 18, 2018, 14 pages.
Zoph, B. et al., "Neural Architecture Search with Reinforcement Learning," Proceedings of the International Conference on Learning Representations, Toulon, France, Apr. 24, 2017, 16 pages.

* cited by examiner

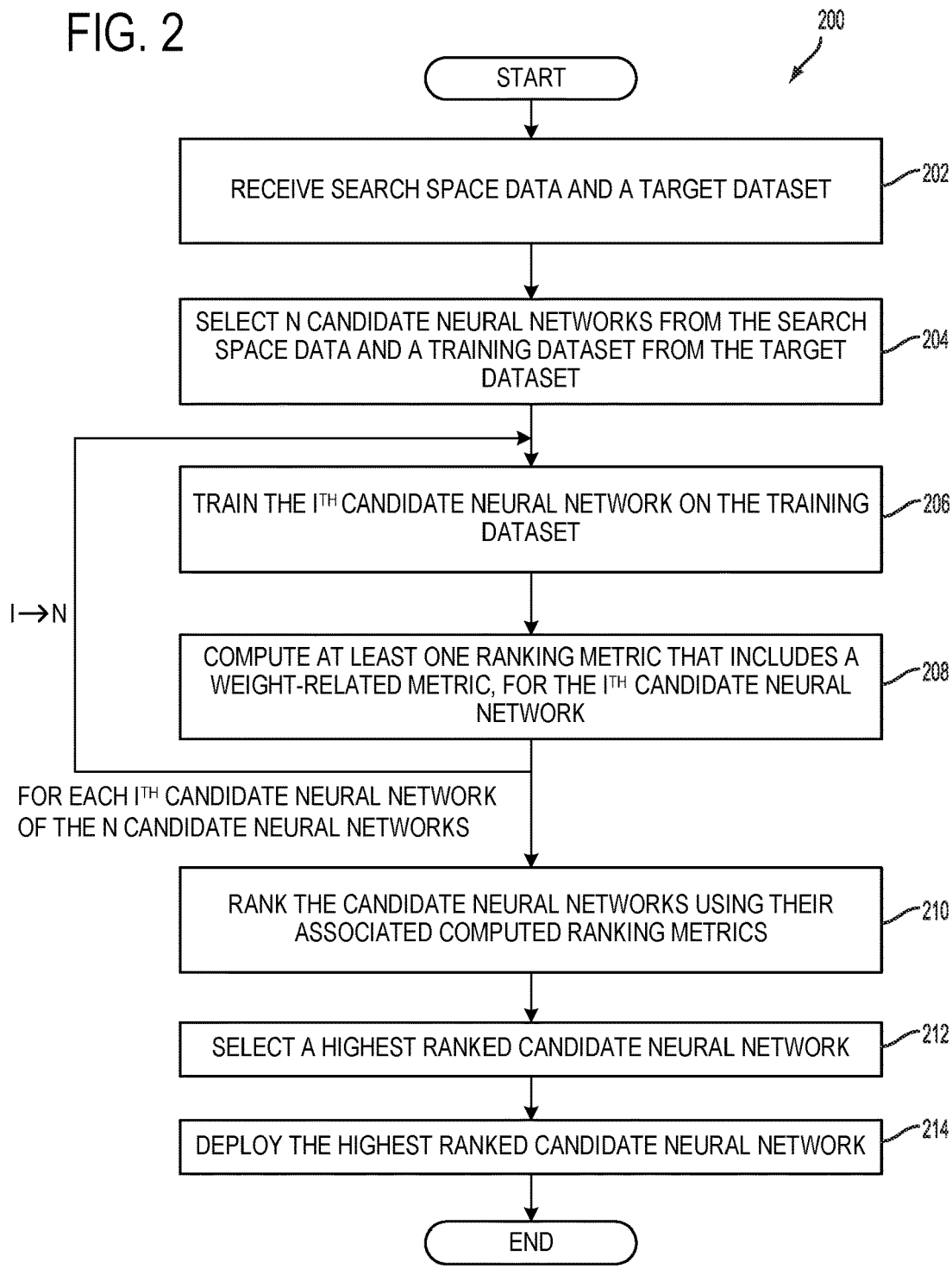

FIG. 8

| Metrics | NAS-Bench-101 | NAS-Bench-201 | | |
|---|---|---|---|---|
| | CIFAR-10 | CIFAR-10 | CIFAR-100 | ImageNet16-120 |
| #Param | 92.6(1.3) | 93.2(0.5) | 70.1(0.8) | 41.6(4.1) |
| LR1 | 91.6(0.9) | 92.3(1.1) | 66.2(5.0) | 43.1(2.5) |
| NTK | 91.2(0.9) | 91.9(1.7) | 66.6(4.3) | 41.4(4.9) |
| LR2 | 92.8(1.2) | 92.6(0.0) | 69.3(1.4) | 43.3(2.9) |

FIG. 9

| | #Param | | |
|---|---|---|---|
| Metrics | LR1 | NTK | LR2 |
| Correlation | 0.39 | 0.30 | 0.56 |

FIG. 11

| Metrics | #Param | Angle Loss | AngleLoss |
|---|---|---|---|
| Correlation | 0.20 | -0.11 | 0.07 |

FIG. 12

| Metrics | Search Cost (s) | CIFAR-10 | CIFAR-100 | ImageNet16-120 |
|---|---|---|---|---|
| #Param | 3 | 93.21(0.49) | 70.15(0.83) | 41.58(4.07) |
| LR1 | 60 | 92.30(1.07) | 66.23(4.96) | 43.12(2.52) |
| LR1+#Param | 60 | 92.96(0.55) | 69.83(0.43) | 43.71(2.20) |
| NTK | 181 | 91.94(1.70) | 66.63(4.29) | 41.38(4.88) |
| NTK+#Param | 181 | 93.12(0.48) | 69.82(0.73) | 42.39(1.61) |
| LR2 | 48 | 92.65(0.93) | 69.28(1.40) | 43.33(2.91) |
| LR2+#Param | 48 | 93.33(0.13) | 70.10(1.22) | 42.83(1.49) |
| AngleLoss | 437 | 84.65(5.88) | 58.06(0.40) | 28.08(0.31) |
| AngleLoss+#Param | 437 | 93.46(0.59) | 70.58(0.82) | 43.74(1.48) |
| AngleLoss+LR2 | 462 | 93.08(0.66) | 69.62(0.59) | 43.43(1.62) |

FIG. 13

| Method | Search Cost (s) | CIFAR-10 | CIFAR-100 | ImageNet16-120 |
|---|---|---|---|---|
| RSPS | 8007 | 87.66(1.69) | 58.33(4.34) | 31.14(3.88) |
| DARTS (1st) | 10889 | 54.30(0.00) | 15.61(0.00) | 16.32(0.00) |
| GDAS | 28925 | 93.61(0.09) | 70.70(0.30) | 41.84(0.90) |
| TE-NAS | 1558 | 93.90(0.47) | 71.24(0.56) | 42.38(0.46) |
| TE-NAS† | 682 | 93.20(0.29) | 70.44(1.34) | 42.34(0.63) |
| AngleLoss | 508 | 93.16(0.37) | 70.48(1.04) | 43.04(1.82) |
| AngleLoss+#Param | 508 | 93.36(0.26) | 70.87(0.41) | 43.77(1.33) |

FIG. 14

| Method | Search Cost (GPU days) | Params (M) | Top-1 Error (%) | Search Method |
|---|---|---|---|---|
| NASNet-A | 2000 | 3.3 | 2.65 | RL |
| ENAS | 0.5 | 4.6 | 2.89 | RL |
| AmoebaNet-A | 3150 | 3.2 | 3.34 | evolution |
| DARTS (1st) | 0.4 | 3.3 | 3.00 | gradient |
| DARTS (2nd) | 1.0 | 3.3 | 2.76 | gradient |
| GDAS | 0.17 | 2.5 | 2.82 | gradient |
| P-DARTS | 0.3 | 3.4 | 2.50 | gradient |
| PC-DARTS | 0.1 | 3.6 | 2.57 | gradient |
| SDARTS-ADV | 1.3 | 3.3 | 2.61 | gradient |
| TE-NAS | 0.05 | 3.8 | 2.63 | training-free |
| AngleLoss | 0.09 | 3.2 | 2.63 | short-training |
| AngleLoss+#Param | 0.09 | 3.2 | 2.56 | short-training |

FIG. 15

| Method | Search Cost (GPU days) | Params (M) | Top-1 (%) | Top-5 (%) | Search Method | Search Dataset |
|---|---|---|---|---|---|---|
| NASNet-A | 2000 | 5.3 | 26.0 | 8.4 | RL | |
| AmoebaNet-C | 3150 | 6.4 | 24.3 | 7.6 | evolution | |
| DARTS (2nd) | 4.0 | 4.7 | 26.7 | 8.7 | gradient | |
| GDAS | 0.21 | 5.3 | 26.0 | 8.5 | gradient | |
| P-DARTS | 0.3 | 4.9 | 24.4 | 7.4 | gradient | CIFAR-10 |
| PC-DARTS | 0.1 | 5.3 | 25.1 | 7.8 | gradient | |
| TE-NAS | 0.05 | 6.3 | 26.2 | 8.3 | training-free | |
| AngleLoss | 0.09 | 4.7 | 24.7 | 7.5 | short-training | |
| AngleLoss+#Param | 0.09 | 4.7 | 25.2 | 7.7 | short-training | |
| ProxylessNAS | 8.3 | 7.1 | 24.9 | 7.5 | gradient | |
| PC-DARTS | 3.8 | 5.3 | 24.2 | 7.3 | gradient | |
| TE-NAS | 0.17 | 5.4 | 24.5 | 7.5 | training-free | ImageNet-1K |
| AngleLoss | 0.11 | 4.8 | 25.5 | 8.1 | short-training | |
| AngleLoss+#Param | 0.11 | 5.9 | 24.1 | 7.1 | short-training | |

FIG. 16

(a) Number of training iterations.

| #Iters | 10 | 25 | 50 | 75 |
|---|---|---|---|---|
| Cost (s) | 99 | 230 | 437 | 673 |
| Acc (%) | 70.22(1.08) | 70.33(0.91) | 70.58(0.82) | 70.37(0.57) |

(b) Number of sampled classes.

| #Classes | 5 | 10 | 20 |
|---|---|---|---|
| Cost (s) | 332 | 437 | 641 |
| Acc (%) | 70.02(0.74) | 70.58(0.82) | 70.30(0.74) |

(c) Network initialization.

| Init. | Kaiming_uniform | Kaiming_normal | Xavier_uniform |
|---|---|---|---|
| Cost (s) | 437 | 437 | 437 |
| Acc (%) | 70.58(0.82) | 70.40(0.70) | 70.25(1.00) |

(d) Number of sampled images.

| #Images | 5 | 10 | 20 |
|---|---|---|---|
| Cost (s) | 347 | 437 | 627 |
| Acc (%) | 70.26(1.08) | 70.58(0.82) | 70.28(0.97) |

NEURAL ARCHITECTURE SEARCH SYSTEM USING TRAINING BASED ON A WEIGHT-RELATED METRIC

BACKGROUND

Machine learning is a developing field of study in which models are trained to perform inference tasks based on training data, using training algorithms. One type of machine learning model is a neural network. Neural networks have been applied to perform various inference tasks in fields such as computer vision, natural language processing, etc. Neural networks include layers of nodes connected by weighted connections. The layers may be configured to perform different functions, such as convolution, pooling, deep learning, classification, and regression. The layers are configured by adjusting the connection topology and activation functions of the nodes. In this way, the layers of nodes in the neural network may be formed into functional building blocks, and those functional building blocks may be arranged into different neural network architectures, to accomplish different training and inference tasks. These architectures can be grouped into different network types, and for each network type a variety of specific architectures can be generated. Common neural network types include convolutional neural networks (CNNs), recurrent neural networks (RNNs), bi-directional long short term memory (LSTM) RNNs, encoder-decoder transformers, encoder-only transformers, Siamese networks, etc. A neural network is trained at training time based on a training dataset, and the weights of the connections are adjusted using an algorithm such as backpropagation. At inference time, the trained neural network is configured to receive an inference time input and produce an inference time output in response. If the inference time input is similar to the training time inputs, the trained neural network generally will perform a more accurate prediction at inference time.

As will be appreciated, the performance of neural networks largely depends on their architectural design, which can require high expertise and extensive amounts of time and effort. Instead of time-consuming manual design, Neural Architecture Search (NAS) has been proposed as a technique in automating the design of neural networks by searching network structures for a given prediction task to find efficient and effective architectures for models. Early NAS methods use reinforcement learning or evolutionary algorithms to search networks. These methods utilize a controller to generate a number of networks, and the performances of these networks are used as feedback information to update the controller in an iterative loop. However, traditional NAS algorithms tend to be slow and expensive as a large number of candidate networks were fully trained and evaluated in the iterative search process, reaching costs of up to thousands of GPU days in some NAS algorithms.

Different methods exist to accelerate NAS algorithms. One class of such methods includes the use of weight-sharing in a supernet. In one implementation, referred to as Efficient Neural Architecture Search via Parameters Sharing (ENAS), the weights are shared among candidate networks so that they can be trained simultaneously. Another method includes Differentiable Architecture Search (DARTS), which concatenates all candidate operations into a supernet, and each operation is assigned an architecture parameter denoting its importance. During training, the architecture parameters and weight parameters are optimized alternatively. Another kind of weight-sharing method is referred to as a one-shot NAS, where a supernet is trained with sub-networks that are stochastically sampled in each iteration.

Another class of solutions aimed at speeding up the search process includes training-free NAS methods. These methods propose to predict network performance without training. One such method evaluates the effectiveness of different pruning-at-initialization criteria for NAS. Another method, termed Neural Architecture Search Without Training (NAS-WOT), leverages the number of linear regions (LR) to rank different networks. In a further framework called Training-Free Neural Architecture Search (TE-NAS), the number of LR can be further combined with a neural tangent kernel (NTK) to rank a network by its expressivity and trainability. These training-free metrics have incrementally reduced the search cost to several minutes while still achieving competitive results compared with previous NAS methods.

SUMMARY

Systems for performing neural architecture search are described in the present disclosure. In one aspect, the system includes at least a processor and memory, where the memory includes a neural architecture search program that, when executed by the processor, causes the processor to perform a neural architecture search. The processor is configured to receive search space data indicating a search space of neural networks configured to perform a predetermined task. From the search space data, a number of candidate neural networks are selected. The candidate neural networks are then evaluated based on an objective function through a training process, which includes being trained on a training dataset to the perform the predetermined task. From the training process, at least one ranking metric is computed. The ranking metric can be a weight-related metric that is determined based on weights of the prediction layer of the candidate neural network. The candidate neural networks are then ranked based on their ranking metrics.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention.

FIG. 2 is a flowchart conceptually illustrating a Neural Architecture Search (NAS) method that includes ranking and utilizing neural networks in accordance with an implementation of the present disclosure, which may be implemented using the system of FIG. 1 or other suitable hardware and software.

FIG. 3 is a table showing a comparison of the Kendall's Tau of two angle metric variants on randomly sampled networks with different and same #Param, that were sampled using the system of FIG. 1.

FIG. 8 is a table showing a comparison of test accuracies using the #Param metric and the training-free metrics LR1, LR2, and NTK, illustrating results obtained by the system of FIG. 1.

FIG. 9 is a table showing a comparison of the Kendall's Tau between the different training-free metrics and #Param on NAS-Bench-201, illustrating results obtained by the system of FIG. 1.

FIG. 11 is a table showing a comparison of the Kendall's Tau between Angle, Loss, and AngleLoss and #Param, illustrating results obtained by the system of FIG. 1.

FIG. 12 is a table showing a comparison of test accuracies of different ranking metrics on NAS-Bench-201 based on random search, illustrating results obtained by the system of FIG. 1.

FIG. 13 is a table showing a comparison of test accuracies and search costs on NAS-Bench-201 based on pruning-based search for different methodologies, illustrating results obtained by the system of FIG. 1.

FIG. 14 is a table comparing the AngleLoss metric with other methods on DARTS space CIFAR-10 dataset, illustrating results obtained by the system of FIG. 1.

FIG. 15 is a table comparing the AngleLoss metric with other methods on DARTS space ImageNet-1K dataset, illustrating results obtained by the system of FIG. 1.

FIG. 16 is a table showing an ablation study on different training hyper-parameters on CIFAR-100 dataset, illustrating results obtained by the system of FIG. 1.

DETAILED DESCRIPTION

As briefly discussed above, different methods have been proposed to alleviate the problems of extensive time and resources being consumed by traditional NAS methods. One such method includes the use of differentiable search with candidate networks sampled from a supernet. During training, the network parameters and architecture parameters are optimized alternatively. To further reduce the search cost, training-free metrics have been proposed to rank the candidate networks without any training process. These metrics are largely inspired by the pruning methods and theoretical findings in deep neural networks. They aim to rank the networks from different aspects of the networks' properties, such as trainability and expressivity. These metrics can achieve competitive results with previous NAS methods at a much smaller search cost.

Although initial evaluations show that the training-free metrics described above are able to estimate network performances, further inquiries into these methods show that their network performances have a poor correlation with their actual performances or that their ranking ability mainly comes from a high correlation with an overlooked metric, the number of parameters (#Param) present in a model architecture. #Param is a training-free metric that, due to its high correlations with the previously proposed training-free metrics (e.g., linear regions, neural tangent kernel), intuitively contributes to the ranking abilities of those metrics' respective methodologies.

Motivated by the observations above, systems and methods in accordance with various embodiments of the invention are presented for neural architecture search. In many embodiments, the neural architecture search includes the use of ranking metrics that are effective indicators of neural network performance while having weak or no correlation with #Param. The performance of the neural architecture search utilizing such ranking metrics becomes more evident in search spaces where the #Param information is not available since the performance of conventional training-free metrics, such as those described above, drops dramatically in such situations. In some embodiments, the ranking metrics utilized are lightweight metrics that are computationally inexpensive, allowing for efficient and quick training-based neural architecture search.

Figure 1:
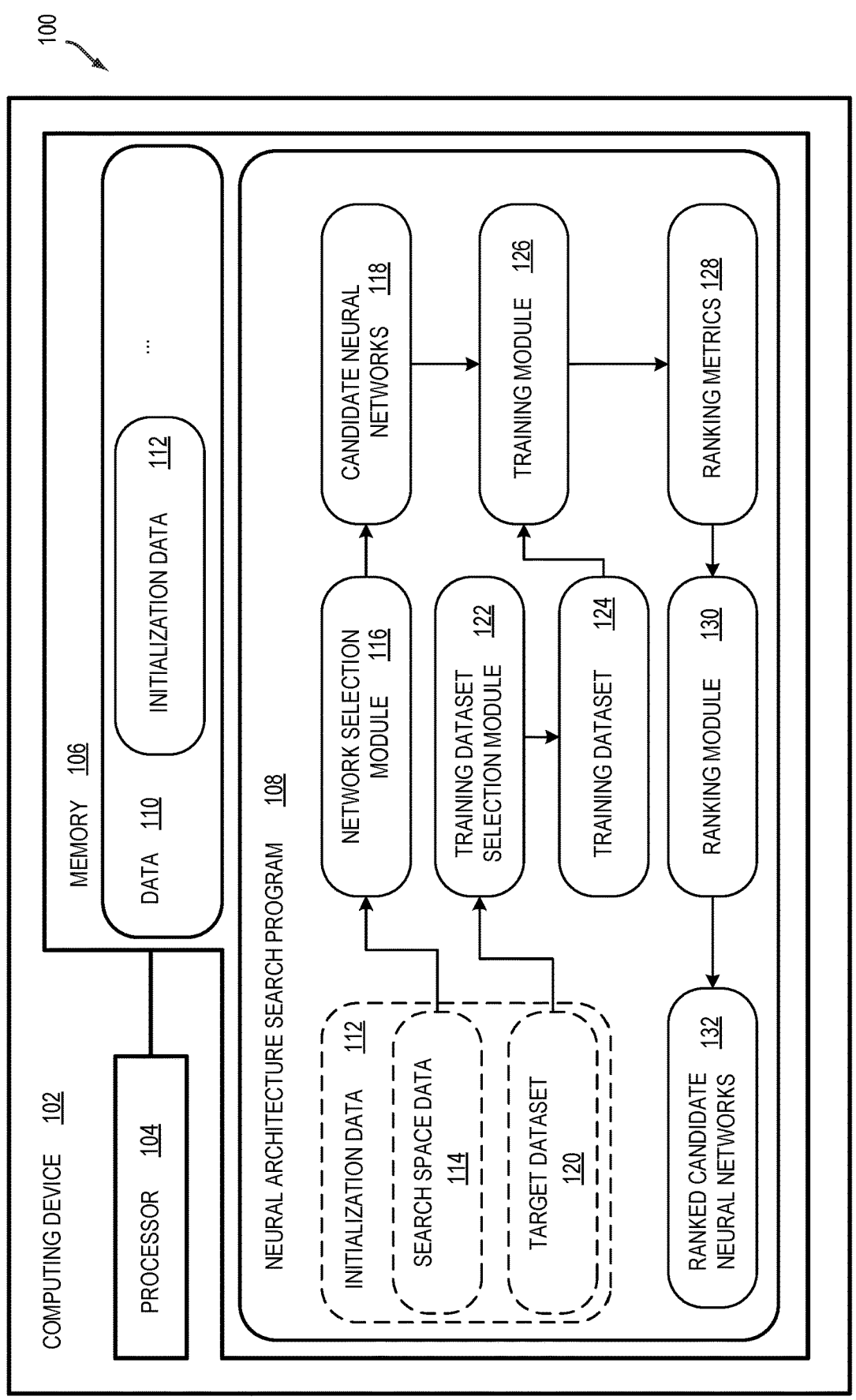
FIG. 1 shows a schematic view of an example computing system configured to perform a neural architecture search with ranking metrics having weak or no correlation to the number of parameters (#Param) in a model architecture, in accordance with an implementation of the present disclosure.

FIG. 1 shows a schematic view of a computing system 100 having a computing device 102 configured to perform a neural architecture search with ranking metrics having weak or no correlation to the number of parameters in a neural network model (#Param) in accordance with an implementation of the present disclosure. As shown, the computing device 102 includes a processor 104 (e.g., central processing units, or "CPUs") and memory 106 (e.g., volatile and non-volatile memory) operatively coupled to each other. The memory 106 stores the NAS program 108, which contains instructions for the various software modules described herein for execution by the processor 104. The memory 106 also stores data 110 for use by the NAS program 108 and its software modules.

Upon execution by the processor 104, the instructions stored in the NAS program 108 cause the processor 104 to retrieve initialization data 112 from data 110 stored in memory 106 for use by the NAS program 108. In the depicted system of FIG. 1, the initialization data 112 includes search space data 114 that are used as inputs for a network selection module 116. Search space data 114 for NAS applications defines or describes the neural network architectures that the algorithm searches through to discover the desired architecture for the specific need of the application. For example, the search space data 114 can define possible neural network architectures configured to perform a predetermined task. Different network architectures such as but not limited to convolutional neural networks, recurrent neural networks, transformers, sub-networks can also be implemented. The network selection module 116 generates a set of candidate neural networks 118 by selecting neural networks from the search space data 114. Different selection methods may be used depending on the particular application. For example, stochastic or random sampling of only a subset of the neural architectures in the search space may be performed. Since only a subset of the architectures are evaluated, an approximation of an optimally efficient neural network among all candidate architectures is generated. Such sampling methods are typically used in an initialization stage where there is no additional information. In other applications, the set of candidate neural networks 118 includes every neural network architecture in the search space, and the selection method can be to select all neural network architectures in the search space data 114. Such an approach can improve the quality of the estimation of the most efficient neural network architecture, while still remaining computationally feasible due to the efficient evaluation methods described herein.

In the depicted system of FIG. 1, the retrieved initialization data 112 includes a target dataset 120. The type of target dataset 120 utilized depends on the specific application and neural network architectures implemented. For example, NAS programs for finding efficient neural network architectures for image classification may utilize a target dataset that includes images. Alternatively, the NAS program may search among neural architectures for different prediction tasks, such as natural language processing tasks (translation, next word in sequence, or sentiment classification, etc.), graph-based predictions (social network search, route optimization, etc.), etc. A training dataset selection module 122 generates a training dataset 124 of suitable form by selecting from the target dataset 120. Different selection methods may be used depending on the particular application. For example, stochastic or random sampling may be performed in situations where evaluation of the entire search space may be cost or time prohibitive, or simply unnecessary. In such cases, the training dataset may be generated from several sampling iterations. In other applications, the entire target dataset 120 is used as the training dataset 124. A training module 126 receives the set of candidate neural networks 118 and the training dataset 124 and evaluates a performance of each of the candidate neural network 118 based on an objective function by training the candidate neural networks 118 using the training dataset 124 to perform a predetermined task (e.g., image classification, natural language processing, etc.).

The neural network training process can be performed in many different ways. For example, the training module 126 can train each candidate neural network 118 in an iterative training process. In further configurations, the candidate neural network 118 is trained for a predetermined number of iterations. From the neural network training process, at least one ranking metric 128 is derived for each candidate neural network 118. As discussed above, ranking metrics having weak or no correlation to #Param may be used to provide meaningful and effective information in estimating the performances of the neural networks. For example, the ranking metric can include a weight-related metric that is determined based on weights of the prediction layer of the respective candidate neural network before and after the respective candidate neural network is trained. Further details of these and other metrics are discussed in the sections below. Using the derived ranking metrics 128, a ranking module 130 can generate a ranked list 132 of the candidate neural networks 118 in accordance with certain predetermined criteria.

Although FIG. 1 illustrates a specific computing device for performing a neural architecture search, other devices and configurations may be implemented depending on the specific requirements of a given application. For example, the target dataset and search space data may be stored on a memory module (e.g., a non-volatile mass storage device) separate from the NAS algorithm program. In addition to different system configurations, the NAS program can be implemented in different ways. For example, the NAS method can include steps of utilizing and deploying the ranked list of candidate neural networks for specific applications.

FIG. 2 is a flowchart conceptually illustrating an efficient NAS method 200 that includes ranking and utilizing neural networks in accordance with an implementation of the present disclosure. At step 202, the method includes receiving search space data and a target dataset. At step 204, the method selects a set of N candidate neural networks from the search space data. The method also selects a training dataset that is a subset of the target dataset. The method then performs an iterative training loop including steps 206 and 208. At step 206, the method trains an $i^{th}$ candidate neural network from the set of N candidate neural networks on the training dataset. At step 208, the method computes at least one ranking metric for the $i^{th}$ candidate neural network. Different ranking metrics may be computed depending on the specific implementation. In method 200, step 208 computes at least one ranking metric that includes a weight-related metric for the $i^{th}$ candidate neural network. After N training loops, ranking metrics will have been computed for every candidate neural network within the set. At step 210, the method ranks the candidate neural networks using their associated computed ranking metrics. The ranking method can be based on the type of ranking metric or metrics computed and/or the intended implementation of the neural networks. At step 212, the method selects the highest ranked candidate neural network. At step 214, the method deploys the highest ranked candidate neural network. Deployment of the highest ranked candidate neural network may include implementing the neural network in an external system for use in another application.

Efficient NAS methods, such as those described above, can be implemented in different variations that utilize different datasets and ranking metrics to determine the ideal neural network architecture in accordance with a given objective function. In applications desiring quick and efficient training, a shortened training-based NAS methodology may be implemented. These and other implementations are discussed below in further detail.

The ranking metric or metrics utilized in a NAS method are an important part in determining the effectiveness of that respective methodology in estimating neural network performances. Intuitively, a network's performance after training is indicated by the structure (e.g., #Param, number of layers), weights initializations, and the dynamics during training (e.g., loss, gradients). Metrics that arise from the training dynamics are typically weakly correlated with #Param. For example, certain metrics derived from the weights of the network structure are highly correlated with the accuracy of the neural network's performance, but lowly correlated with the #Param. This indicates that such metrics can provide additional information that #Param does not on estimating the performance of a network.

One weight-related, lightweight (i.e., quick to compute and small storage size) metric is the angle metric, which is a training dynamic that indicates the network's generalization ability and can be calculated differently depending on the specific implementation. In one example, the angle metric is defined as the angle between the one-dimensional, vectorized network weights before and after training. Consider that $W_0$ denotes the weights of a network N at initialization, and $W_t$ denote the weights after training. The angle metric can then be defined as $$\theta(N) = \arccos\left(\frac{W_0 \cdot W_t}{\|W_0\|_2 \|W_t\|_2}\right)$$

where $W_0 \cdot W_t$ is the inner product of $W_0$ and $W_t$. As can readily be appreciated, similar or other methodologies can be utilized to describe the angle metric.

Typically, the angle metric is positively correlated with a network's final performance. However, the angle metric may behave differently at different network stages (that is, when examined for different layers or groups of layers within the network). Specifically, in some cases, the angle metric computed with the weights from the feature extraction layers of the neural network is positively correlated with the network's final accuracy. In most NAS search spaces, the feature extraction stage is mainly constructed by a stack of network modules, often comprising convolutional layers. On the other hand, the angle metric computed with the weights of the prediction layer (e.g., the final fully connected layer of a plurality of hidden layers downstream of the feature extraction layers) is typically negatively correlated with the network's performance. The angle metric of the feature extraction layers can be denoted by $\theta_{feat}$, and the angle metric of the prediction layer can be denoted by $\theta_{pred}$. FIG. 3 is a table showing a comparison of the Kendall rank correlation coefficients (Kendall's Tau) of the two angle metric variants, $\theta_{feat}$ and $\theta_{pred}$, on randomly sampled networks with different and same #Param. Tests were conducted on fifty randomly sampled networks from NAS-Bench-201, a commonly used benchmark for neural architecture search with a fixed search space. The sampled networks were fully trained on CIFAR-10, a dataset of images commonly used for computer vision training. As shown, for the sampled networks having different #Param, $\theta_{feat}$ is positively correlated with the accuracy of the network while $\theta_{pred}$ is negatively correlated. $\theta_{pred}$ has a higher correlation than $\theta_{feat}$. For the sampled networks with the same #Param, the Kendall's Tau of $\theta_{feat}$ drops dramatically to around zero. Therefore, $\theta_{feat}$ is likely a poor indicator for ranking neural networks without the #Param information. On the other hand, the Kendall's Tau of $\theta_{pred}$ shows a level of correlation that indicates its ability to effectively predict network performance without the #Param metric.

Besides the angle metric, training loss can also be utilized as an effective, lightweight metric that achieves good performance without any or much additional computation. For example, combining training loss with $\theta_{pred}$ gives richer information on model performance without increasing the computational cost. Since the scales of $\theta_{pred}$ and training loss are different, directly adding their values in a ranking process can cause one to dominate the other. To avoid this problem, the networks can be ranked by the two metrics separately. Their ranking indices can be used to provide a final ranking. Both $\theta_{pred}$ and training loss are negatively correlated with the model accuracy. As such, the negative values of the two metrics can be made positive for certain computations.

Figure 4:
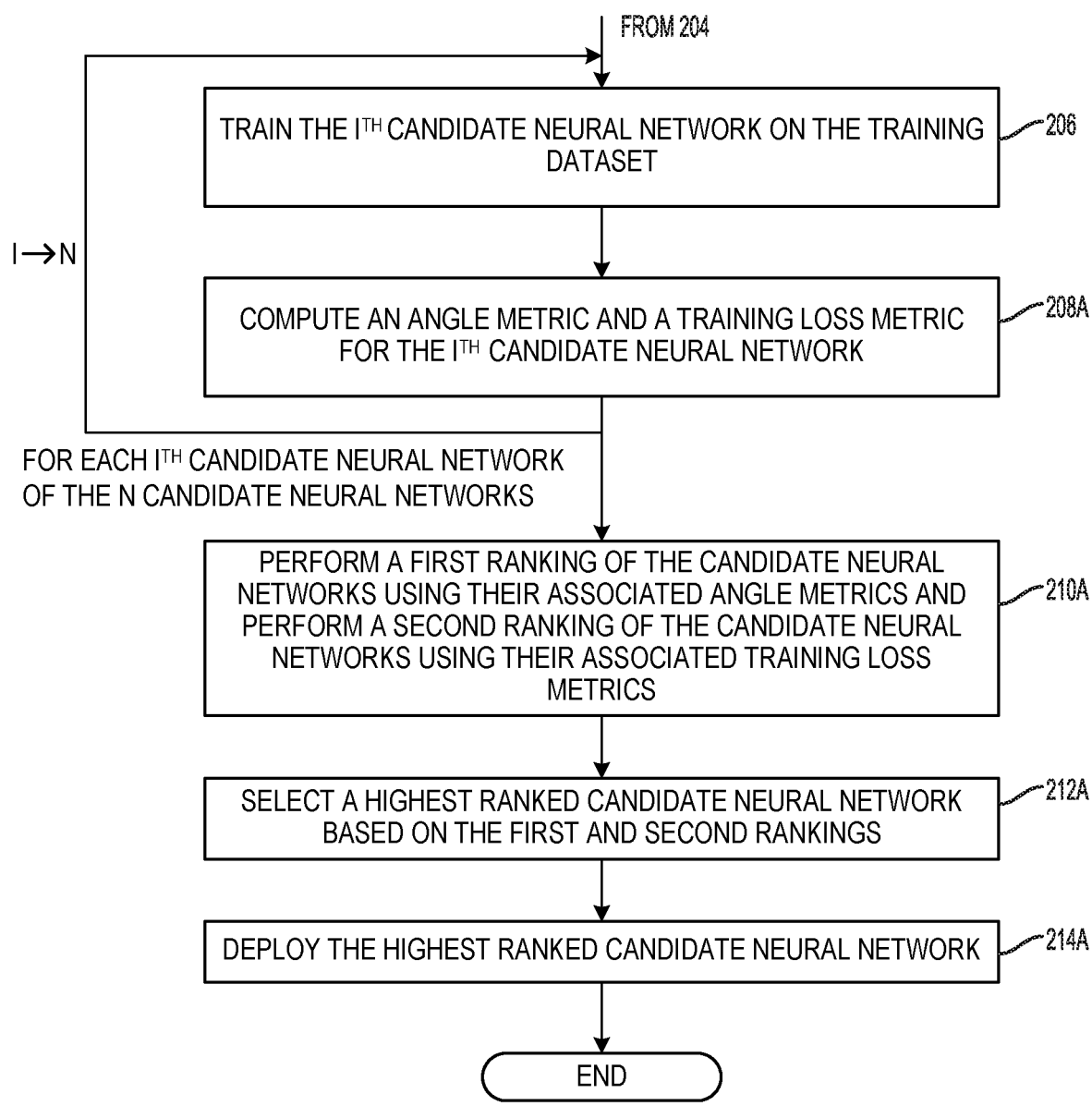
FIG. 4 is a flowchart conceptually illustrating a NAS method that utilizes angle metrics and training loss metrics for ranking candidate neural networks in accordance with an implementation of the present disclosure, which is a variant of the method of FIG. 2.

FIG. 4 is a flow chart conceptually illustrating a NAS method that utilizes angle metrics and training loss metrics for ranking candidate neural networks in accordance with an implementation of the present disclosure. As shown, the method is similar in certain aspects to that of the method described in FIG. 2 but with a different configuration for implementing steps 206-214. At step 208A, the method computes ranking metrics that include an angle metric and a training loss metric for the current $i^{th}$ candidate neural network being trained. At step 210A, the method ranks the candidate neural networks. Since more than one ranking metric was computed, the ranking process may include specific steps for providing a final ranking. For example, ranking step 210A includes performing a first ranking of the candidate neural networks based on the computed angle metrics and performing a second ranking of the candidate neural networks based on the computed training loss metrics. At step 212A, the method selects a highest ranked candidate neural network based on the first and second rankings. At step 214A, the method deploys the selected highest ranked candidate neural network.

Although FIG. 4 describes a method utilizing specific ranking metrics, any of a number of other ranking metrics can be utilized as appropriate depending on the specific requirements of a given application. For example, other weight-related metrics can be utilized. In some configurations, the ranking metric is a distance metric computed from the weights of the prediction layer of the neural network. Distance metrics such as Minkowski distance, Cosine distance, Mahalanobis distance, Hamming distance, etc. may be used as appropriate.

Figure 5:
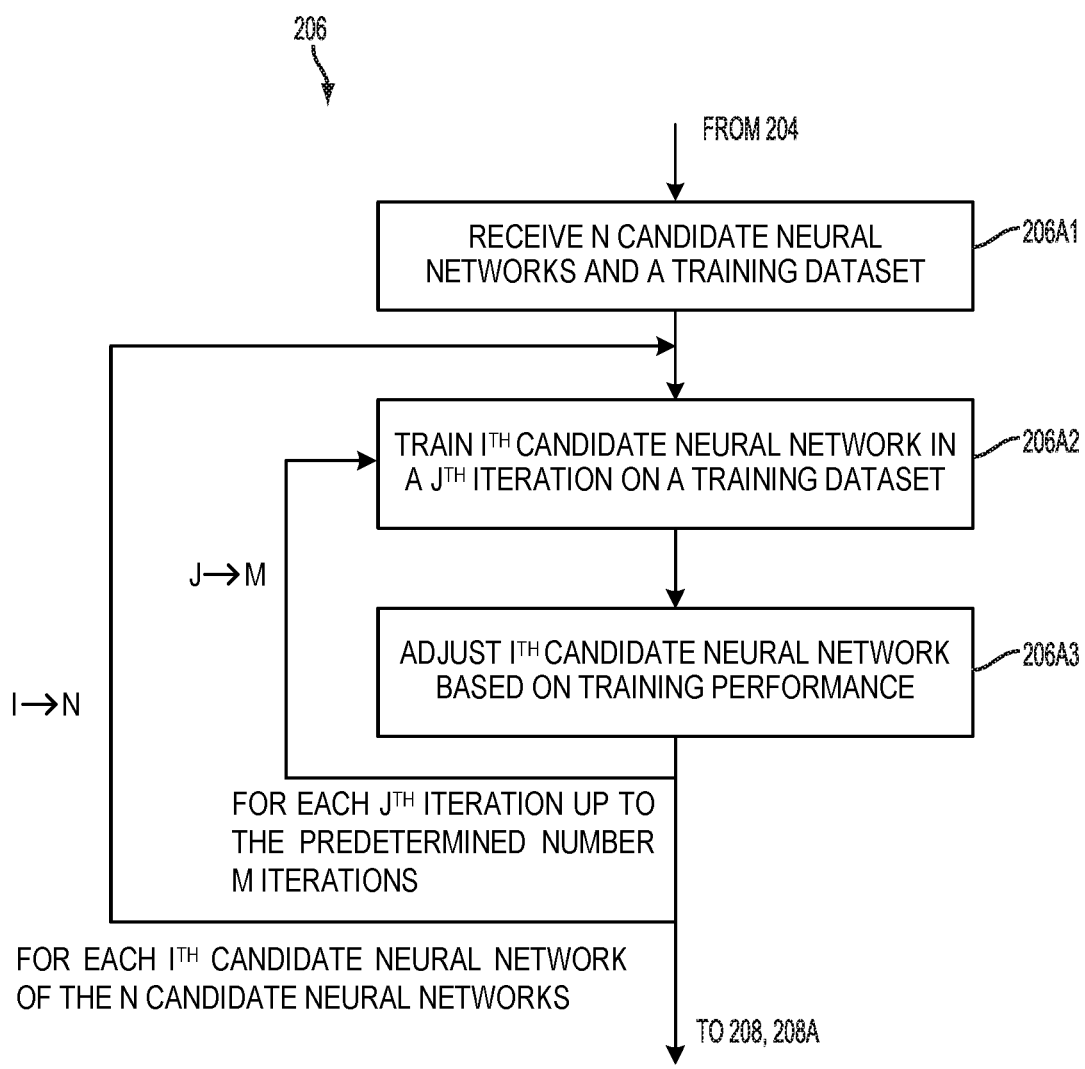
FIG. 5 is a flowchart conceptually illustrating an iterative network training process having a predetermined number of iterations, which can be used to implement a step of the method of FIG. 2

Neural network training may be performed in a number of different ways. For example, the training of candidate neural networks can be implemented in an iterative process. The candidate neural networks may be trained with a reinforcement learning loop. In some applications, the candidate neural networks may be trained to convergence. In other applications, it is highly desirable for the training process to be quick and efficient. In such cases, the training process can be configured to perform a short-training process where the candidate neural networks are trained for a predetermined number of iterations that is smaller than would result in convergence, resulting in partially trained candidate neural networks that have not been trained to convergence. FIG. 5 is a flow chart conceptually illustrating an iterative network training process having a predetermined number of iterations in accordance with an implementation of the present disclosure. As shown, the process can be a particular implementation for step 206 of method 200 described in FIG. 2. At step 206A1, the process receives a set of N candidate neural networks and a training dataset. The set of N candidate neural networks and the training dataset may be generated using various methods. For example, similar to the methods described in the sections above, candidate neural networks may be generated by sampling from a search space of network architectures, and the training dataset may be generated by sampling from a target dataset. The process includes an iterative training loop. At step 206A2, an $i^{th}$ candidate neural network out of the set of N candidate neural network is trained for a $j^{th}$ iteration out of predetermined number M iterations. At step 206A3, the $i^{th}$ candidate neural network is adjusted in a $j^{th}$ iteration based on its performance during the $j^{th}$ training iteration. Steps 206A2 and 206A3 are performed in two nested loops, with the inner loop describing the iterative training process for a single candidate neural network while the outer loop describes the iterative training process for the set of N candidate neural networks. As such, steps 206A2 and 206A3 are performed an M×N number of times. As can readily be appreciated, the process described in FIG. 5 can be expanded to include steps of other processes described herein. For example, the process can include determining a training loss metric based on the performance of the respective candidate neural network on the training dataset in a last iteration of the predetermined number of iterations.

Figure 6:
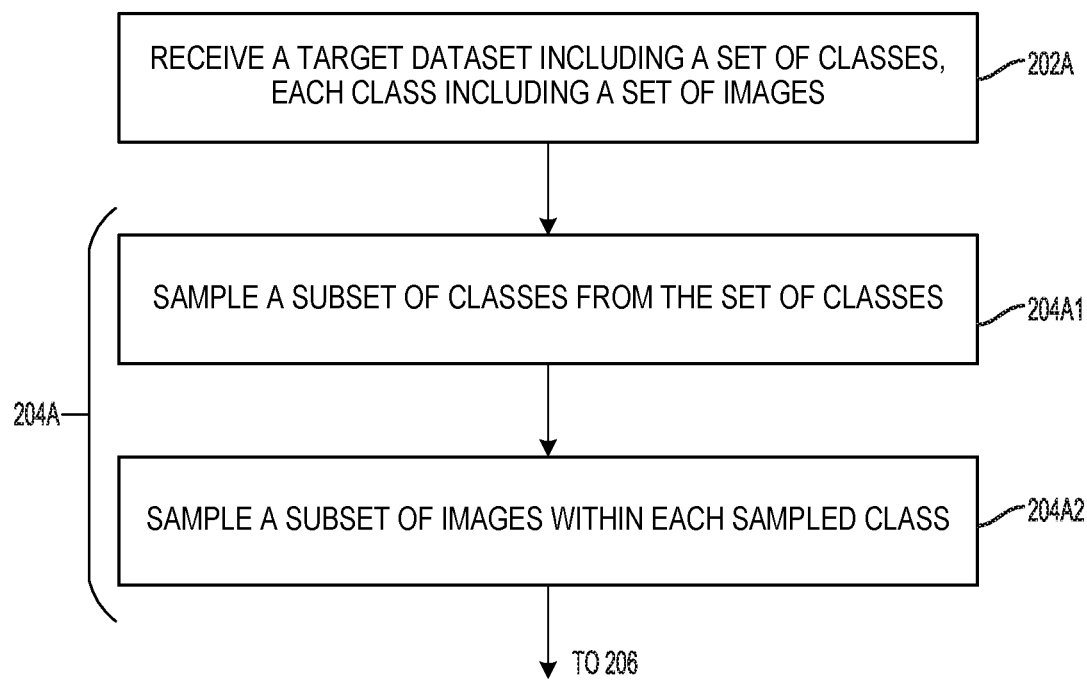
FIG. 6 is a flowchart conceptually illustrating a process for generating a proxy dataset from a target dataset of images separated into different classes, which can be used to implement steps of the method of FIG. 2, FIGS. 7A-7C show an example of sampling training datasets from a target dataset of images that may be used with the system of FIG. 1.
Figure 7A:
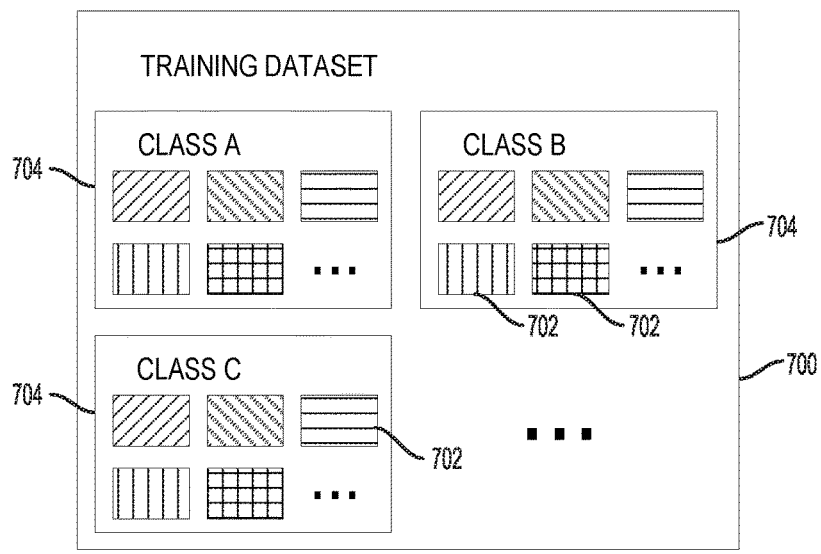
Figure 7B:
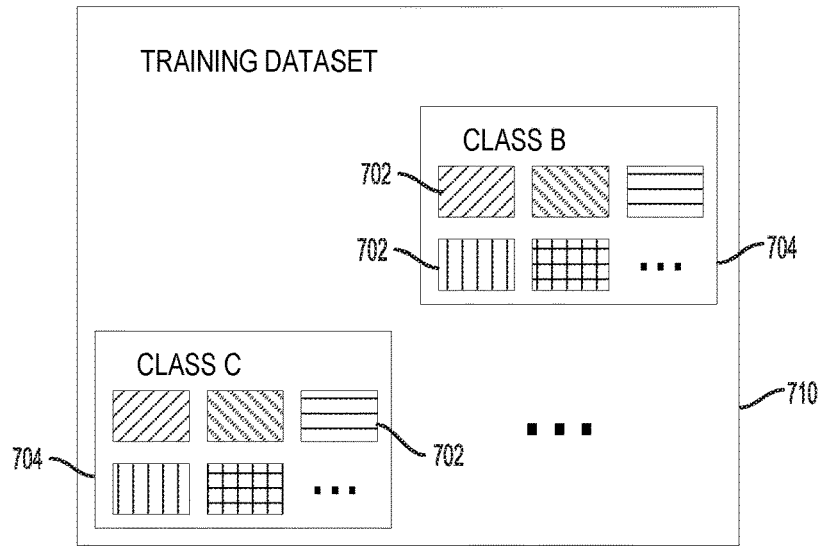
Figure 7C:
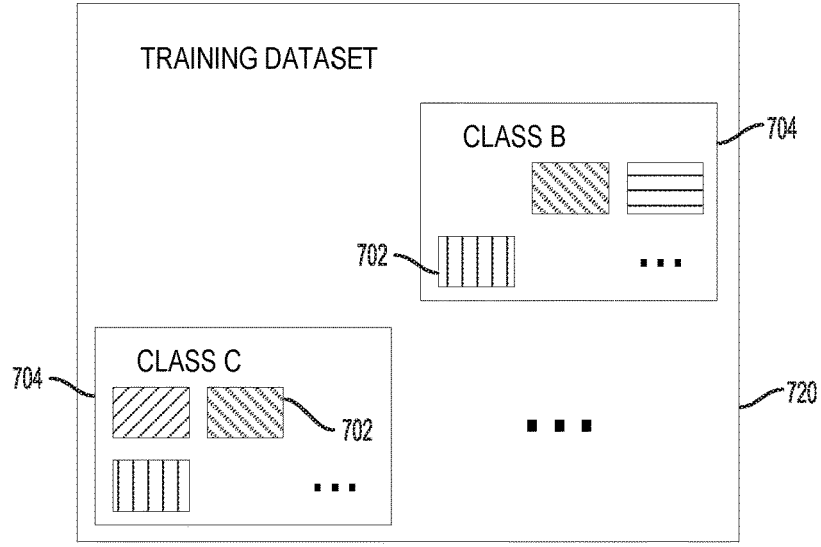

Another process to achieve efficient training includes training the candidate neural networks on a proxy dataset, which can reduce the computational requirements. In certain cases, such training schemes can be thousands of times faster than traditional training and can even be faster than schemes utilizing training-free metrics. A proxy dataset may be generated by sampling the target dataset. Different sampling methods, including random sampling, may be used. The specific method utilized can be dependent on the target dataset. For example, common machine learning and computer vision algorithms use target datasets of images separated into different classes. The sampling method can consider the classifications of the images in such datasets. FIG. 6 is a flowchart conceptually illustrating a process for generating a proxy dataset from a target dataset of images separated into different classes in accordance with an implementation of the present disclosure. As shown, the process can be implemented as a different configuration of steps 202 and 204 of method 200 as described in FIG. 2. At step 202A, the process receives a target dataset including a set of classes, each class including a set of images. The process includes a sampling step 204A as an implementation of the selection step 204 of method 200. At step 204A1, the process samples a subset of classes from the target dataset. At step 204A2, the process samples a subset of images within each sampled class. FIGS. 7A-7C show an example of sampling training datasets from a target dataset of images in accordance with an implementation of the present disclosure. FIG. 7A shows a training dataset 700 including images 702 separated into classes 704. FIG. 7B shows a training dataset 710 sampled from the original training dataset 700. As shown, the sampled training dataset 710 includes images 702 from classes B and C. Images from class A were not sampled. FIG. 7C shows a further sampled training dataset 720 where another sampling was performed within each of the sampled classes, reducing the number of images in each sampled class.

As can readily be appreciated, the methods described above can be utilized in different combinations depending on the specific requirements of a given application. For example, an efficient NAS method may include training the candidate neural networks on a proxy dataset for a predetermined number of iterations. When the method includes the use of a proxy dataset and limited number of training iterations, the effectiveness of certain ranking metrics may be different compared to when utilized in more traditional training methods. Therefore, it is important to understand how the ranking metric behaves in such settings. The $\theta_{pred}$ metric and the training loss metric, for example, are effective for ranking the candidate neural networks in a compact setting utilizing proxy datasets and limited number of training iterations.

Many types of ranking metrics exist for implementation with NAS methods. The effectiveness of certain ranking metrics may vary depending on the method implemented. Selecting appropriate ranking metrics that are effective indicators for ranking neural networks may be deceptively difficult. For example, previous methodologies relying on training-free metrics presumes that such metrics were effective in estimating the performance of a network. However, closer inquiries into such methodologies show that the metrics utilized were strongly correlated with #Param. Without further studies, it would be difficult to know whether the metrics utilized or #Param are contributing to the method's ranking ability.

TE-NAS and NASWOT are two training-free methodologies that rely on the number of linear regions as a ranking metric. Linear region is a well-studied theoretical criterion to indicate the learning capacity of a network. Linear region metrics describe how many regions into which a network could split the input space. A larger number of LR typically indicates that the network has higher performance. The number of LR is estimated differently in TE-NAS and NASWOT (termed LR1 and LR2, respectively). TE-NAS calculates liner regions by forwarding a batch of samples to the network and count how many samples have different activation patterns while NASWOT feeds a batch of samples to the network and compute the Hamming distance between different activation patterns. The Hamming distance between these activation patterns is used to define a kernel matrix K. The ranking metric is defined as the determinant of K. TE-NAS further utilize the neural tangent kernel (NTK) to score networks. The network's convergence speed can be determined by the condition number of NTK. Intuitively, a faster convergence speed indicates that the network has a higher performance. As such, the condition number of NTK is also used to rank networks.

The NAS methodologies and training-free metrics described above produce effective results. However, given that these training-free metrics are highly correlated with #Param, it is important to understand which metric is contributing to their methodology's ranking ability. FIG. 8 is a table showing a comparison of test accuracies using the #Param metric and the training-free metrics LR1, LR2, and NTK. The tests were performed on benchmarks NAS-Bench-101 and NAS-Bench-201 on datasets CIFAR-10, CIFAR-100, and ImageNet16-120. FIG. 8 shows results from the performance of the highest ranked neural network based on the relevant metrics. The neural network is selected from one hundred sampled networks from the appropriate search space. Test accuracy is presented with mean and standard deviation values (n=5). As shown, all the metrics tested resulted in high performances, with #Param performing the best on NAS-Bench-201 on CIFAR-10 CIFAR-100. FIG. 9 is a table showing the Kendall's Tau between the different training-free metrics and #Param on NAS-Bench-201. As shown, the training-free metrics have high correlations with #Param, especially the two linear region metrics. This is intuitively plausible because the number of linear regions is upper bounded by $2^{\#activation}$ and the number of activation units is highly correlated with the #Param. The high correlations indicate that the ranking abilities of these training-free metrics, or a large portion of it, may come from #Param.

Figure 10:
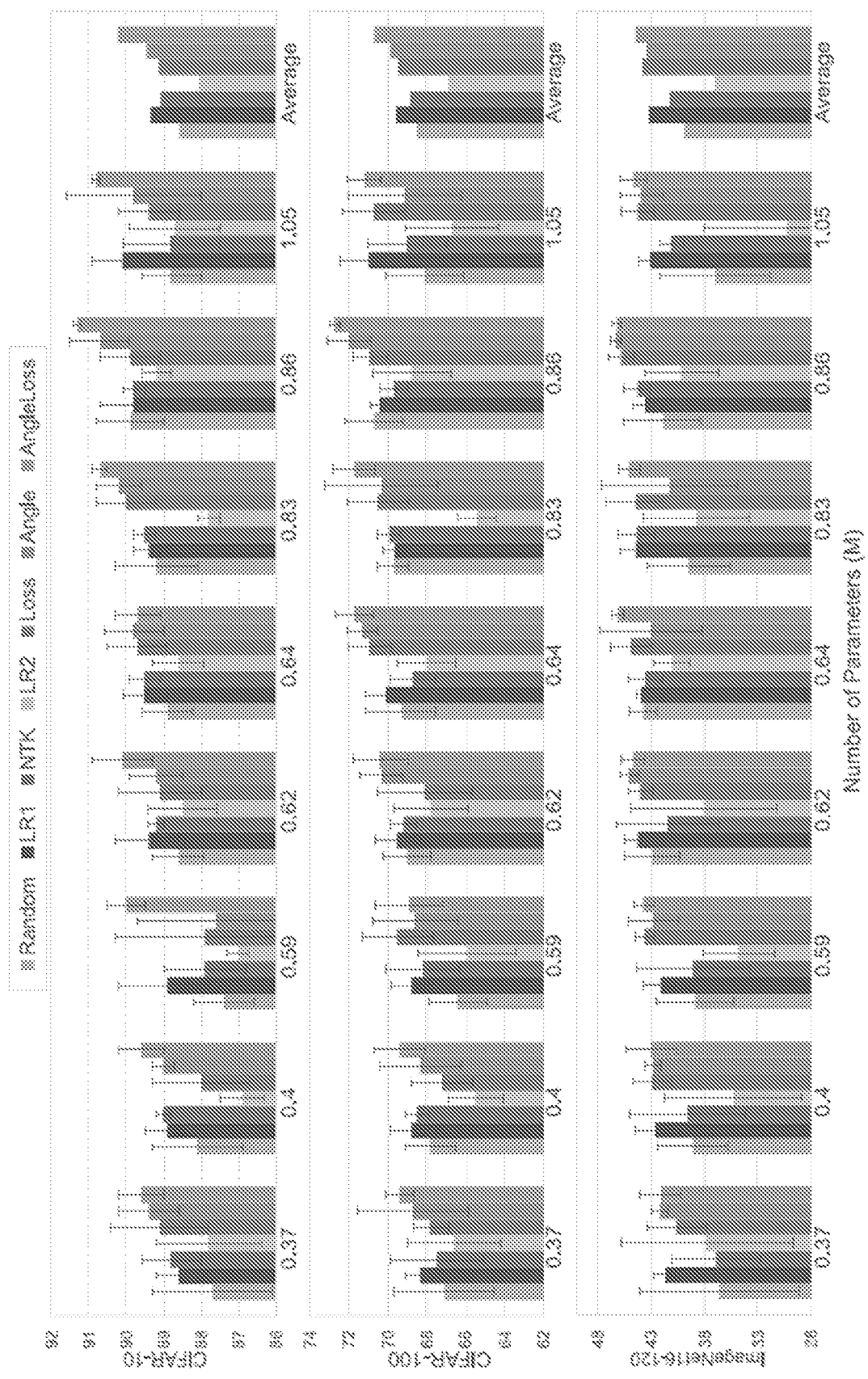
FIG. 10 is a chart showing test accuracies (%) of different ranking metrics evaluated on neural networks having the same number of parameters, illustrating results obtained by the system of FIG. 1.

To further validate the observations above, the different training-free metrics described above can be evaluated on curated search spaces of neural networks having the same number of parameters. This prevents the metrics from using the parameter information to evaluate the neural networks. FIG. 10 is a chart showing test accuracies (%) of different ranking metrics evaluated on neural networks having the same number of parameters. Search spaces are crafted based on NAS-Bench-201. NAS-Bench-201 defines a cell-based search space where each cell is represented as a densely-connected directed acyclic graph (DAG). Each cell has four nodes and six edges, where each edge represents an operation. There are 5 candidate operations, including zeroize, skip-connect, 1×1 cony, 3×3 cony, and 3×3 avg pooling. Different models may have the same number of parameters but different structures and performances. Eight groups of models are chosen, and models in the same group has the same number of parameters. For the chart shown in FIG. 10, the number of parameters M for the eight chosen groups are {0.37, 0.40, 0.59, 0.62, 0.64, 0.83, 0.86, 1.05}. The number of neural networks in each group is {1602, 540, 1602, 810, 180, 540, 180, 135}, respectively. The neural networks are evaluated on datasets CIFAR-10, CIFAR-100, and ImageNet16-120. Ten classes are randomly sampled, and ten images are sampled from each class. One hundred neural networks are randomly sampled from each network group, and the best-performing network is selected based on the respective ranking metric. Each neural network is trained for fifty iterations with a fixed learning rate of 0.2. Other settings follow those in NAS-Bench-201. Unless indicated otherwise, similar settings are utilized for other tests described in the present disclosure.

In FIG. 10, the evaluated ranking metrics include LR1, NTK, LR2, Loss, Angle, and AngleLoss. A baseline that randomly selects a neural network from the candidate neural networks is also included. Angle denotes searching with $\theta_{pred}$, Loss denotes searching with training loss, and AngleLoss denotes searching with the combination of the two metrics. Mean accuracy and standard deviation are reported for N=5. As shown in FIG. 10, LR2, which has the highest correlation with #Param (as shown in FIG. 9) and high performance on NAS-Bench-101 and CIFAR-10 (as shown in FIG. 8), performs the worst in this scenario, even worse than the random baseline. From these results, it can be inferred that the training-free metrics tested largely rely on the parameter information to rank networks. On the other hand, the AngleLoss metric, a ranking metric with weak or no correlation to #Param, consistently outperforms the training-free metrics on all the neural network groups on the three datasets. In most cases, AngleLoss outperforms the training-free metrics by more than 1%. FIG. 11 is a table showing a comparison of the Kendall's Tau between Angle, Loss, and AngleLoss and #Param. As shown, the correlations are much lower than that of the training-free metrics in FIG. 9.

NAS-Bench-201 is a cell-based search space with 15,625 architectures. Each network's performance is evaluated on CIFAR-10, CIFAR-100 and ImageNet16-120 following a unified training protocol. This benchmark facilitates researchers to focus on the search algorithm without network evaluation. FIG. 12 is a table showing a comparison of test accuracies of different ranking metrics on NAS-Bench-201 based on random search. One hundred neural networks are randomly sampled from the search space and the different ranking metrics are used to select the best performing one. Mean accuracy and standard deviation are reported (n=5). The search cost is measured on a single GTX-1080Ti GPU. #Param is added as a baseline metric. As shown, #Param performs well on CIFAR-10 and CIFAR-100, even slightly better than the training-free metrics LR1, NTK, and LR2. Additionally, #Param is easy to compute, with a search cost of only three seconds on one hundred networks. The linear region-based metrics LR1 and LR2 perform better and are more stable than NTK. The performance of NTK is low and has a very large variance. Although both LR1 and LR2 are based on linear regions, LR2 is slightly better and more stable. As noted above, the effectiveness of the training-free metrics could be attributed to their high correlations with #Param.

By visualizing the searched network structures, the Angle metric could collapse to some trivial structures where most of the connections are zeroize, skip-connect or avg_pooling. In these trivial structures, the feature extraction layers are not learning anything meaningful, and the prediction layer is optimized towards random directions in each training iteration. As such, the weight vector of the prediction layer does not change much after training, which means the Angle metric, and the AngleLoss metric by extension, will give a high score to these structures. By combining the AngleLoss metric with #Param, structures with a small number of parameters can be avoided. They can also be avoided when a pruning-based search method is implemented. As shown in FIG. 12, performances of the AngleLoss metric are significantly boosted by around 10% when combined with #Param, achieving higher performance than the training-free metrics.

In FIG. 12, results from combining the training-free metrics LR1, NTK, and LR2 with #Param are also shown. These training-free metrics slightly benefit from #Param, but the improvement is marginal. Taking #Param as the baseline, its combinations with the training-free metrics degrade its performance on CIFAR-10 and CIFAR-100. On the other hand, the AngleLoss metric combined with #Param achieves consistent improvements compared to just #Param on the three datasets. Similarly, AngleLoss+LR2 improves upon LR2 on all three datasets. From these results, it can be inferred that the AngleLoss metric provides orthogonal information to #Param and the training-free metrics. Combining them can increase performance.

TE-NAS combines LR1 and NTK into a pruning-based search method. For a further comparison, the AngleLoss metric can be applied to the same pruning-based search method. The search starts with a supernet that contains all the operations on each edge. Then it prunes an operation and uses the metrics (LR1 and NTK) to score the sub-network. The operation that leads to the lowest score will be finally pruned. This process is conducted iteratively until each edge only has one operation left. The supernet for one hundred iterations due to a longer convergence.

FIG. 13 is a table showing a comparison of test accuracies and search costs on NAS-Bench-201 based on pruning-based search for different methodologies. The mean and standard deviation are reported (n=5). The performances of other NAS methods are included for reference. Two results are shown for TE-NAS, one is the reported results in the Literature and the other (TE-NASI) is reproduced using the official codes. The reproduced performance is lower while the search cost is also cheaper. Search costs are evaluated on a 1080Ti GPU. As shown in FIG. 13, the short-training method described above using the AngleLoss metric is faster than TE-NAS. TE-NAS needs to compute two metrics (LR1 and NTK), and for each metric it repeats three times and takes the average value for a better and stable performance. The short-training method compute the metric once.

Under the pruning-based search, the AngleLoss metric does not show the collapse problem as in random search. This is because the pruning-based method starts from a supernet, which is non-trivial. With a limited number of pruning steps, the neural network almost never reaches a trivial structure with large numbers of empty operations. As shown in FIG. 13, the original results of TE-NAS are better than the AngleLoss metric on CIFAR-10 and CIFAR-100, but the search cost is 3×more. The AngleLoss metric performance is comparable with the reproduced results of TE-NAS at a lower search cost. On ImageNet16-120, the AngleLoss metric is better than TE-NAS in both cases. The AngleLoss metric is also combined with #Param with negligible additional search cost, which improves the performance on all three datasets by 0.2%— 0.7%.

DARTS is a cell-based search space. The networks in the search space are constructed by a stack of normal cells and reduction cells whose architectures need to be searched. There are 8 candidate operations in the search space, including zeroize, skip-connect, 3×3 and 5×5 separable convolution, 3×3 and 5×5 dilated separable convolution, 3×3 max pooling, and 3×3 average pooling. The AngleLoss metric is applied to the pruning-based search method used in TE-NAS for the following tests. The data sampling and short training scheme is similar to the settings described above, except the learning rate is 0.5.

FIG. 14 is a table comparing the AngleLoss metric with other methods on DARTS space CIFAR-10 dataset. Following TE-NAS, in evaluation phase, the network is stacked by twenty cells and the initial number of channels is thirty-six. The reduction cell is placed at ⅓ and ⅔ of the network and each cell contains six nodes. As shown in FIG. 14, the AngleLoss metric completes the search process in 0.09 days (i.e., 2.16 hours) on a single 1080Ti GPU. Different from the results on NAS-Bench-201, the search cost is higher than TE-NAS in this case since TE-NAS uses a smaller batch-size to compute NTK on DARTS CIFAR-10, resulting in less computation. Nevertheless, the search cost for AngleLoss is still much lower than other NAS methods. The AngleLoss metric also achieves comparable performance with TE-NAS, but the searched network size is much smaller. When combined with #Param, the AngleLoss metric achieves a lower test error of 2.56%, which is competitive with state-of-the-art methods.

FIG. 15 is a table comparing the AngleLoss metric with other methods on DARTS space ImageNet-1K dataset. The short-training setting is the same as in CIFAR-10. For evaluation, the network is stacked with fourteen cells and the initial number of channels is forty-eight. In the top half of FIG. 15, the networks are searched on CIFAR-10 and then evaluated on ImageNet-1K. As shown, AngleLoss is competitive with state-of-the-art NAS methods while having a much lower search cost. Compared to TE-NAS, the performance is significantly better, and the network size is much smaller. The bottom half of FIG. 15 shows the results with different methods searched directly on ImageNet-1K. Pruning-based search with the AngleLoss metric finishes in only 0.11 GPU days (i.e., 2.64 GPU hours), which is even faster than TE-NAS. This is because TE-NAS uses a larger batch-size on ImageNet-1K than that on CIFAR-10. The AngleLoss metric is more than 30×faster than the other NAS methods. The performance of the AngleLoss metric alone is slightly lower than other methods with a smaller model size. When combined with #Param, the performance of the AngleLoss metric is largely improved and reaches a competitive top-1/top-5 error rate of 24.1%/7.1%, outperforming listed differentiable and training-free methods.

FIG. 16 is a table showing an ablation study on different training hyper-parameters on CIFAR-100 dataset. The different hyper-parameters in the short-training scheme described above includes number of training iterations, sampled classes, images per class, and weight initialization methods. The random search method described above was used as the baseline. As shown, longer training iterations tend to achieve better performance as they allow the network to converge better, which yields a more informative angle metric and training loss. However, ten training iterations can still achieve an acceptable performance. Increasing the number of classes does not always improve the performance. Although more classes could provide more information about the target dataset, it also makes the proxy dataset more complex, which makes it more difficult for the neural network to converge in the limited iterations, yielding less informative angle metric and training loss. Similarly, increasing the number of images does not guarantee better performance either. To achieve the optimal accuracy efficiency trade-off, the training hyper-parameters can be tuned. Due to the efficient nature of the short-training method, tuning the hyper-parameters is feasible.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
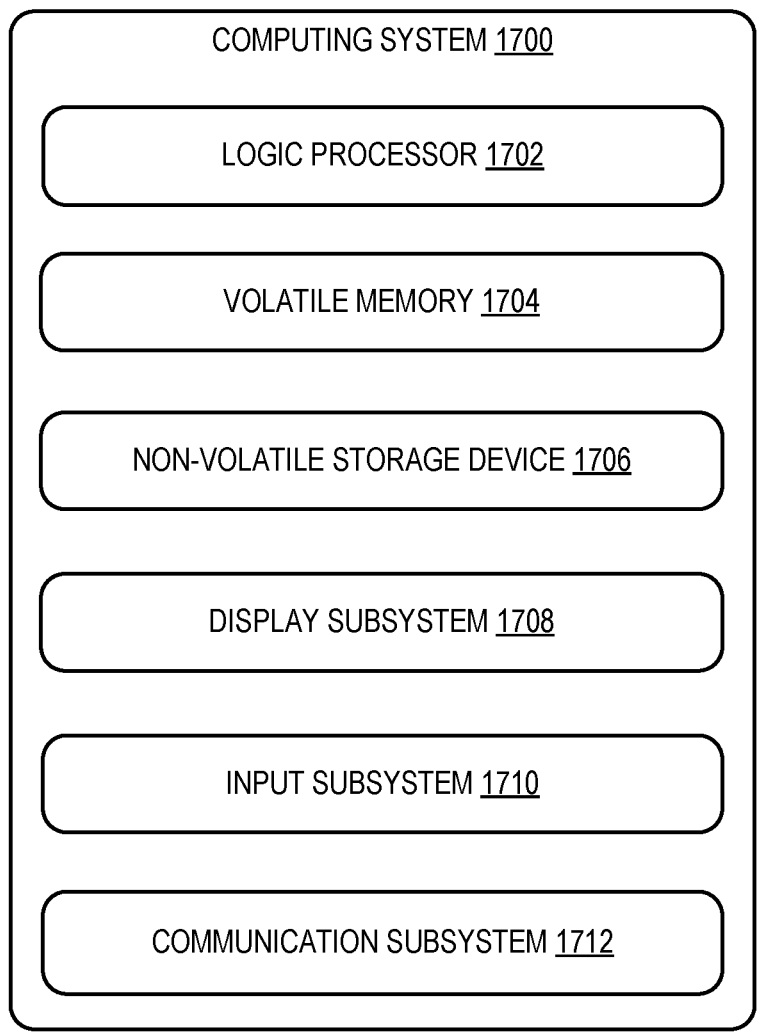
FIG. 17 illustrates an example computer environment that may be utilized to implement the system of FIG. 1.

FIG. 17 schematically shows a non-limiting embodiment of a computing system 1700 that can enact one or more of the methods and processes described above. Computing system 1700 is shown in simplified form. Computing system 1700 may embody the computer device 10 described above and illustrated in FIG. 2. Computing system 1700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1700 includes a logic processor 1702 volatile memory 1704, and a non-volatile storage device 1706. Computing system 1700 may optionally include a display subsystem 1708, input subsystem 1710, communication subsystem 1712, and/or other components not shown in FIG. 17.

Logic processor 1702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1706 includes one or more physical devices configured to hold instructions executable by the logic processors to implement the methods and processes described herein. When such methods and processes are implemented, the state of non-volatile storage device 1706 may be transformed—e.g., to hold different data.

Non-volatile storage device 1706 may include physical devices that are removable and/or built in. Non-volatile storage device 1706 may include optical memory (e.g., CD, DVD, HD-DVD, BLU-RAY DISC®, etc.), semiconductor memory (e.g., ROM, EPROM, EEPROM, FLASH memory, etc.), and/or magnetic memory (e.g., hard-disk drive, floppydisk drive, tape drive, MRAM, etc.), or other mass storage device technology. Non-volatile storage device 1706 may include nonvolatile, dynamic, static, read/write, read-only, sequential-access, location-addressable, file-addressable, and/or content-addressable devices. It will be appreciated that non-volatile storage device 1706 is configured to hold instructions even when power is cut to the non-volatile storage device 1706.

Volatile memory 1704 may include physical devices that include random access memory. Volatile memory 1704 is typically utilized by logic processor 1702 to temporarily store information during processing of software instructions. It will be appreciated that volatile memory 1704 typically does not continue to store instructions when power is cut to the volatile memory 1704.

Aspects of logic processor 1702, volatile memory 1704, and non-volatile storage device 1706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1700 typically implemented in software by a processor to perform a particular function using portions of volatile memory, which function involves transformative processing that specially configures the processor to perform the function. Thus, a module, program, or engine may be instantiated via logic processor 1702 executing instructions held by non-volatile storage device 1706, using portions of volatile memory 1704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1708 may be used to present a visual representation of data held by non-volatile storage device 1706. The visual representation may take the form of a graphical user interface (GUI). As the herein described methods and processes change the data held by the non-volatile storage device, and thus transform the state of the non-volatile storage device, the state of display subsystem 1708 may likewise be transformed to visually represent changes in the underlying data. Display subsystem 1708 may include one or more display devices utilizing virtually any type of technology. Such display devices may be combined with logic processor 1702, volatile memory 1704, and/or non-volatile storage device 1706 in a shared enclosure, or such display devices may be peripheral display devices.

When included, input subsystem 1710 may comprise or interface with one or more user-input devices such as a keyboard, mouse, trackpad, touch sensitive display, camera, or microphone.

When included, communication subsystem 1712 may be configured to communicatively couple various computing devices described herein with each other, and with other devices. Communication subsystem 1712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

The following paragraphs provide additional support for the claims of the subject application. One aspect provides a computer system for use in performing a neural architecture search, the computer system comprising a processor coupled to a storage medium that stores instructions, which, upon execution by the processor, cause the processor to receive search space data indicating a search space of neural networks configured to perform a predetermined task; select a plurality of candidate neural networks within the search space, wherein each candidate neural network includes a prediction layer; evaluate a performance of each of the plurality of candidate neural networks based on an objective function by: training each candidate neural network on a training dataset to perform the predetermined task; and determining at least one ranking metric for each candidate neural network based on the objective function, wherein the at least one ranking metric includes a weight-related metric that is determined based on weights of the prediction layer of the respective candidate neural network before and after the respective candidate neural network is trained; and rank the plurality of candidate neural networks based on the determined ranking metrics. In this aspect, additionally or alternatively, the weight-related metric is an angle metric indicating the angle between one-dimensional vectors calculated from the weights of the prediction layer of the respective candidate neural network before and after the respective candidate neural network is trained. In this aspect, additionally or alternatively, the weight-related metric is a distance metric selected from the group consisting of: Minkowski distance, Cosine distance, Mahalanobis distance, and Hamming distance. In this aspect, additionally or alternatively, the at least one ranking metric further includes a training loss metric that is determined based on the performance of the respective candidate neural network on the training dataset during training; each candidate neural network is trained for a predetermined number of iterations; and the training loss metric is determined based on the performance of the respective candidate neural network on the training dataset in a last iteration of the predetermined number of iterations. In this aspect, additionally or alternatively, the instructions, upon execution by the processor, cause the processor to rank the plurality of candidate neural networks by: assigning each candidate neural network a first ranking number based on the weight-related metric of the candidate neural network; assigning each candidate neural network a second ranking number based on the training loss metric of the candidate neural network; and ranking the plurality of candidate neural network based on the first and second ranking numbers. In this aspect, additionally or alternatively, the instructions, upon execution by the processor, cause the processor to deploy a highest ranked candidate neural network to a computing device. In this aspect, additionally or alternatively, the plurality of candidate neural networks includes every neural network in the search space. In this aspect, additionally or alternatively, the at least one ranking metric further includes a parameter metric indicating the number of parameters of the respective candidate neural network. In this aspect, additionally or alternatively, the training dataset is generated by: receiving a target dataset including a plurality of input data elements classified into a plurality of classes; sampling a subset of the plurality of classes; and for each sampled class, sampling a subset of the plurality of input data elements within the sampled class. In this aspect, additionally or alternatively, the search space of neural networks includes a plurality of convolutional neural networks, recurrent neural networks, transformers, sub-networks, and/or combinations thereof.

Another aspect provides a method for assessing performances of neural network architectures, the method comprising: receiving search space data indicating a search space of neural networks configured to perform a predetermined task; sampling a plurality of candidate neural networks within the search space, wherein each candidate neural network includes a prediction layer; evaluating a performance of each of the plurality of candidate neural networks based on an objective function by: training each candidate neural network on a training dataset to perform the predetermined task; and determining at least one ranking metric for each candidate neural network based on the objective function, wherein the at least one ranking metric includes a weight-related metric that is determined based on weights of the prediction layer of the respective candidate neural network before and after the respective candidate neural network is trained; and ranking the plurality of candidate neural networks based on the determined ranking metrics. In this aspect, additionally or alternatively, the weight-related metric is an angle metric indicating the angle between one-dimensional vectors calculated from the weights of the prediction layer of the respective candidate neural network before and after the respective candidate neural network is trained. In this aspect, additionally or alternatively, the weight-related metric is a distance metric selected from the group consisting of: Minkowski distance, Cosine distance, Mahalanobis distance, and Hamming distance. In this aspect, additionally or alternatively, the at least one ranking metric further includes a training loss metric that is determined based on the performance of the respective candidate neural network on the target dataset during training; each candidate neural network is trained for a predetermined number of iterations; and the training loss metric is determined based on the performance of the respective candidate neural network on the training dataset in a last iteration of the predetermined number of iterations. In this aspect, additionally or alternatively, ranking the plurality of candidate neural networks includes: assigning each candidate neural network a first ranking number based on the weight-related metric of the candidate neural network; assigning each candidate neural network a second ranking number based on the training loss metric of the candidate neural network; and ranking the plurality of candidate neural network based on the first and second ranking numbers. In this aspect, additionally or alternatively, the method further comprises deploying a highest ranked candidate neural network to a computing device. In this aspect, additionally or alternatively, the plurality of candidate neural networks includes every neural network in the search space. In this aspect, additionally or alternatively, the at least one ranking metric further includes a parameter metric indicating the number of parameters of the respective candidate neural network. In this aspect, additionally or alternatively, the training dataset is generated by: receiving a target dataset including a plurality of input data elements classified into a plurality of classes; sampling a subset of the plurality of classes; and for each sampled class, sampling a subset of the plurality of input data elements within the sampled class. In this aspect, additionally or alternatively, the search space of neural networks includes a plurality of convolutional neural networks, recurrent neural networks, transformers, sub-networks, and/or combinations thereof.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system for use in performing a neural architecture search, the computer system comprising:
   a processor coupled to a storage medium that stores instructions, which, upon execution by the processor, cause the processor to:
      receive search space data indicating a search space of neural networks configured to perform a predetermined task;
      select a plurality of candidate neural networks within the search space, wherein each candidate neural network includes a prediction layer;
      evaluate a performance of each of the plurality of candidate neural networks based on an objective function by:
         training each candidate neural network on a training dataset to perform the predetermined task; and
         determining at least one ranking metric for each candidate neural network based on the objective function, wherein the at least one ranking metric includes a weight-related metric that is determined based on weights of the prediction layer of a respective candidate neural network before and after the respective candidate neural network is trained; and
      rank the plurality of candidate neural networks based on the determined ranking metrics.

2. The computer system of claim 1, wherein the weight-related metric is an angle metric indicating an angle between one-dimensional vectors calculated from the weights of the prediction layer of the respective candidate neural network before and after the respective candidate neural network is trained.

3. The computer method of claim 1, wherein the weight-related metric is a distance metric selected from the group consisting of: Minkowski distance, Cosine distance, Mahalanobis distance, and Hamming distance.

4. The computer system of claim 1, wherein:
   the at least one ranking metric further includes a training loss metric that is determined based on the performance of the respective candidate neural network on the training dataset during training;
   each candidate neural network is trained for a predetermined number of iterations; and
   the training loss metric is determined based on the performance of the respective candidate neural network on the training dataset in a last iteration of the predetermined number of iterations.

5. The computer system of claim 4, wherein the instructions, upon execution by the processor, cause the processor to rank the plurality of candidate neural networks by:
assigning each candidate neural network a first ranking number based on the weight-related metric of the candidate neural network;
assigning each candidate neural network a second ranking number based on the training loss metric of the candidate neural network; and
ranking the plurality of candidate neural network based on the first and second ranking numbers.

6. The computer system of claim 4, wherein the instructions, upon execution by the processor, cause the processor to deploy a highest ranked candidate neural network to a computing device.

7. The computer system of claim 1, wherein the plurality of candidate neural networks includes every neural network in the search space.

8. The computer system of claim 1, wherein the at least one ranking metric further includes a parameter metric indicating the number of parameters of the respective candidate neural network.

9. The computer system of claim 1, wherein the training dataset is generated by:
receiving a target dataset including a plurality of input data elements classified into a plurality of classes;
sampling a subset of the plurality of classes; and
for each sampled class, sampling a subset of the plurality of input data elements within the sampled class.

10. The computer system of claim 1, wherein the search space of neural networks includes a plurality of convolutional neural networks, recurrent neural networks, transformers, sub-networks, and/or combinations thereof.

11. A method for assessing performances of neural network architectures, the method comprising:
receiving search space data indicating a search space of neural networks configured to perform a predetermined task;
sampling a plurality of candidate neural networks within the search space, wherein each candidate neural network includes a prediction layer;
evaluating a performance of each of the plurality of candidate neural networks based on an objective function by:
training each candidate neural network on a training dataset to perform the predetermined task; and
determining at least one ranking metric for each candidate neural network based on the objective function, wherein the at least one ranking metric includes a weight-related metric that is determined based on weights of the prediction layer of a respective candidate neural network before and after the respective candidate neural network is trained; and
ranking the plurality of candidate neural networks based on the determined ranking metrics.

12. The method of claim 11, wherein the weight-related metric is an angle metric indicating an angle between one-dimensional vectors calculated from the weights of the prediction layer of the respective candidate neural network before and after the respective candidate neural network is trained.

13. The method of claim 11, wherein the weight-related metric is a distance metric selected from the group consisting of: Minkowski distance, Cosine distance, Mahalanobis distance, and Hamming distance.

14. The method of claim 11, wherein:
the at least one ranking metric further includes a training loss metric that is determined based on the performance of the respective candidate neural network on the target dataset during training;
each candidate neural network is trained for a predetermined number of iterations; and
the training loss metric is determined based on the performance of the respective candidate neural network on the training dataset in a last iteration of the predetermined number of iterations.

15. The method of claim 14, wherein ranking the plurality of candidate neural networks includes:
assigning each candidate neural network a first ranking number based on the weight-related metric of the candidate neural network;
assigning each candidate neural network a second ranking number based on the training loss metric of the candidate neural network; and
ranking the plurality of candidate neural network based on the first and second ranking numbers.

16. The method of claim 11, further comprising deploying a highest ranked candidate neural network to a computing device.

17. The method of claim 11, wherein the plurality of candidate neural networks includes every neural network in the search space.

18. The method of claim 11, wherein the at least one ranking metric further includes a parameter metric indicating the number of parameters of the respective candidate neural network.

19. The method of claim 11, wherein the training dataset is generated by:
receiving a target dataset including a plurality of input data elements classified into a plurality of classes;
sampling a subset of the plurality of classes; and
for each sampled class, sampling a subset of the plurality of input data elements within the sampled class.

20. The method of claim 11, wherein the search space of neural networks includes a plurality of convolutional neural networks, recurrent neural networks, transformers, sub-networks, and/or combinations thereof.

* * * * *